UNITED STATES PATENT OFFICE.

SAMUEL W. VAUGHEN, OF JOHNSTOWN, PENNSYLVANIA.

PROCESS OF TREATING FURNACE-SLAG.

SPECIFICATION forming part of Letters Patent No. 669,019, dated February 26, 1901.

Application filed January 9, 1900. Serial No. 874. (No specimens.)

*To all whom it may concern:*

Be it known that I, SAMUEL W. VAUGHEN, a citizen of the United States, and a resident of Johnstown, in the county of Cambria and State of Pennsylvania, have invented a certain new and useful Improvement in Processes for Treating Furnace-Slag; and I do declare the following to be a full, clear, and exact description of the invention, such as will enable others skilled in the art to which it appertains to make and use the same.

This invention relates to the utilization of the hitherto waste slag made by blast-furnaces producing pig-iron and also other furnaces of similar character. This waste material has been in the past generally thrown away, and the disposing of it has been a source of expense to the manufacturers.

The invention consists in the process for the recovery of the silica, lime, magnesia, alumina, &c., contained in furnace-slags, hereinafter set forth.

Slag consists principally of lime and magnesia combined with silica, containing also considerable quantities of alumina and lesser amounts of iron and manganese. On account of the manner in which these elements are combined as silicates it has been heretofore found impracticable to separate them or bring them into any useful forms except by some grinding processes which do not change their chemical form. It was not generally believed to be a commercial success to treat the slag with acids, for the reason that too much of the acid would be absorbed by the large amount of lime present in the slag; but I have devised a method by which the acid absorbed is recovered as a valuable product, based on my discovery that the lime sulfate produced in treating blast-furnace slag with sulfuric acid may be by certain methods of treatment made into a material which has all the properties of plaster-of-paris, which is, in fact, impure plaster-of-paris and very suitable as a basis for the manufacture of wall-plaster and other similar purposes.

My new and improved process is as follows: The liquid slag as it flows from the blast-furnace is "granulated" by being run into large vessels filled with water. This sandy material is next introduced into a grinding-mill, and to the mass is added sulfuric acid in regulated quantity, and the whole is then ground together until the lime and the sulfuric acid react together, forming lime sulfate and separating out the silica. When the reaction is over, the whole contents of the mill is transferred to a drying-plate and dried until any gelatinous silica becomes dehydrated. The dry material is next run through a dry grinding-mill and into a wet bur-mill, into which a small quantity of water is added. This leaches out all of the sulfates which are soluble in water, and the whole mass of soluble and insoluble sulfates and silica is next run through a filter-press and the insoluble lime sulfate mixed with silica separated from the soluble portions. This mixture of lime sulfate and silica I have discovered can be transformed into a material which I call "white residue," having all the properties of plaster-of-paris. This is done by subjecting it to a calcination at a proper temperature in a similar manner to that practiced in the manufacture of plaster-of-paris from natural gypsum-rock. In the use of wall-plaster made in the ordinary way sand or silica is added either at the time of applying to the wall or previously in the course of the manufacture. When using my white residue, however, for such purposes, a less quantity of sand has to be added, for the reason that it already has a certain amount of this ingredient present.

As blast-furnace slags vary somewhat in the proportion of silica and lime which they carry, I find it convenient before dissolving to add, if necessary, a small amount of lime or limestone to the mixture in such quantities as will bring up the total percentage of lime to a constant—that is, where a slag is too high in silica and low in lime I add enough lime (usually from five to twenty-five per cent. of the slag weight) to equalize it before dissolving. In practice, therefore, before mixing the slag and the acid I first subject the slag to a complete chemical analysis, and if I find that the particular sample to be treated is too low in lime—that is, if it is found to be below forty-five per cent. of lime—I add enough lime to it to bring up the total percentage of lime to forty-five per cent., or thereabout. I then proceed, as above described, to separate and recover the different elements of the slag. After the insoluble lime sulfate mixed with silica has been separated, as above described, in the filter-press from the liquor containing the balance of the elements—viz., the alumina sulfate, iron sulfate, magnesia sulfate, and manganese sulfate—I proceed to recover the latter substances in the following way: I concentrate the liquor to a consistency of about 20° Baumé, when I find that a part of the magnesia sulfate unites with some remaining lime sulfate and forms flat crystals of a double-lime-magnesia salt, which I separate out and find to be a useful product for the purposes of covering steam-pipes, deadening walls, &c., and also as a basis for the preparation of other magnesia salts. The liquor is again concentrated by means of heat and enough sulfate or chlorid of potassium added to crystallize out about three-quarters of the amount of alumina present in the liquor in the form of potash alum. Any potash salt is suitable for this purpose. After allowing this strong liquor to stand for some time I find that about three-quarters of the alumina has separated out in the form of crystals of potash alum, which I now separate from the mother-liquor, and I have found this alum to be a chemically-pure article, not to be distinguished from the regular article of commerce produced in the usual way. The mother-liquor now contains the magnesia, iron, and manganese and the remaining alumina sulfate. This I concentrate again to a thick syrup and allow to cool slowly, when the alumina sulfate crystallizes out and I transfer it to a press and press out the mother-liquor again. The alumina sulfate in this form I find to be identical with the "alum cake" of commerce, but not as chemically pure an article as the first portion of the alumina obtained as potash alum. In this manner I obtain two grades of alumina sulfate—one chemically pure (potash alum) and the other less pure, (alum cake.) The final residual liquor consists of a mixture of iron and manganese sulfates and chlorids, together with some magnesia sulfate. This I evaporate to dryness and then calcine in a calcining-furnace with access of free oxygen, which oxidizes the mixed sulfates to oxids, giving an article very useful as a red pigment and similar in character to the Venetian red of the arts.

What I claim as new and useful, and for which I desire Letters Patent, is as follows:

1. The process of treating furnace slag or cinder, which consists in mixing together about equal weights of such slag or cinder and sulfuric acid, together with five to twenty-five per cent. of the slag weight of lime, and separating the resultant lime sulfate and silica from the soluble sulfates, substantially as specified.

2. The process of treating furnace slags or cinders, which consists in subjecting a mixture of such slags or cinders and a regulated quantity of lime to the action of sulfuric acid and separating the resultant insoluble lime sulfate and silica from the soluble sulfates, substantially as specified.

3. The process of treating furnace slags or cinders, which consists in mixing such slags with a regulated quantity of lime of about five to twenty-five per cent., and about an equal weight of sulfuric acid, separating the insoluble from the soluble portions, and recovering the magnesia contained in the waste liquor by concentrating the latter until the magnesia lime salt crystallizes out, and subsequently separating this from the residual liquor, substantially as specified.

4. The process of treating furnace slag or cinder, which consists in mixing such slag in a granulated form with about five to twenty-five per cent. of lime, treating the mixture with about one to one and one-half parts of sulfuric acid, separating the insoluble white residue from the soluble sulfates, recovering the crystallizable magnesia sulfate contained in the liquor as double sulfate of lime and magnesia, and recovering the alumina as potash alum and alum cake by adding to the residual liquor potassium salts and crystallizing the alum and the alum cake, substantially as specified.

5. The process of treating furnace-slags, which consists in mixing such granulated slags with five to twenty-five per cent. of lime, treating the mixture with one to one and one-half parts of sulfuric acid, separating the resultant white residue, recovering the crystallizable magnesia sulfate as double sulfate of lime and magnesia, recovering the alumina by adding to the residual liquor potassium salts, and crystallizing out the alum, and recovering the residual iron, manganese and magnesia by evaporating the final mother-liquor to dryness and calcining the dry mixed sulfates and chlorids until they turn to oxids, substantially as specified.

6. The process of treating furnace slag or cinder, which consists in mixing the slag with about an equal weight of sulfuric acid, separating out and recovering the resultant white residue of artificial gypsum, concentrating the residual liquor, and recovering the crystallizable magnesia sulfate therefrom, adding to the second residual liquor potassium salt, and recovering the crystallizable alumina sulfate as alum, concentrating again the third residual liquor, and separating the remainder of the alumina sulfate from the final residual liquor, and recovering the iron, manganese and the balance of the magnesia by evaporating the final residual liquor, and drying and calcining the solid products obtained therefrom, substantially as specified.

7. The process of treating furnace-slags, which consists in first granulating the same, and mixing therewith sufficient lime to bring up the total percentage of lime to a constant, and second, adding sulfuric acid to such mixture, and grinding until the lime and the sulfuric acid react to form lime sulfate, substantially as specified.

8. The process of treating furnace-slag, which consists in first granulating such slag, second, mixing the same with sulfuric acid and grinding such mixture until the lime and the sulfuric acid react to form lime sulfate, third, drying such mixture to dehydrate any gelatinous silica, fourth, again grinding such mixture, and finally adding water to leach out the soluble sulfates, substantially as specified.

9. The process of treating furnace-slag, which consists in first granulating such slag, second, intimately mixing the same with sulfuric acid, until the lime and the sulfuric acid react to form lime sulfate, third, drying such mixture to dehydrate any gelatinous silica, and fourth, leaching out the soluble sulfates from such mixture, substantially as specified.

10. The process of treating furnace-slag, which consists in first granulating such slag, second, intimately mixing the same with sulfuric acid until the lime and the sulfuric acid react to form lime sulfate, third, leaching out the soluble sulfate from such mixture, and separating the insoluble residue from the resulting solution, and fourth, crystallizing and separating from such solution magnesia sulfate as double sulfate of lime and magnesia, substantially as specified.

11. The process of treating furnace-slag, which consists in first granulating such slag, second, intimately mixing the same with sulfuric acid until the lime and the sulfuric acid react to form lime sulfate, third, leaching out the soluble sulfates from such mixture, and separating the insoluble residue from the resulting solution, fourth, crystallizing and separating from such solution magnesia sulfate as double sulfate of lime and magnesia, and fifth, adding a potassium salt to the residual liquor, and crystallizing therefrom potash alum and alum cake, substantially as specified.

In testimony whereof I affix my signature in presence of two witnesses.

SAMUEL W. VAUGHEN.

Witnesses:
FRANK. J. JENKINS,
WILLIAM VAREATT.